(12) United States Patent
Ji et al.

(10) Patent No.: US 11,404,055 B2
(45) Date of Patent: Aug. 2, 2022

(54) SIMULTANEOUS DEREVERBERATION AND DENOISING VIA LOW LATENCY DEEP LEARNING

(71) Applicant: Agora Lab, Inc., Santa Clara, CA (US)

(72) Inventors: Yunyun Ji, Shanghai (CN); Ruofei Chen, Shanghai (CN); Zihe Liu, Shanghai (CN); Xiaohan Zhao, Shanghai (CN); Siqiang Yao, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 110 days.

(21) Appl. No.: 17/072,605

(22) Filed: Oct. 16, 2020

(65) Prior Publication Data

US 2022/0122597 A1 Apr. 21, 2022

(51) Int. Cl.
  *G10L 15/20* (2006.01)
  *G10L 25/03* (2013.01)
  *G10L 15/16* (2006.01)

(52) U.S. Cl.
  CPC .............. *G10L 15/20* (2013.01); *G10L 15/16* (2013.01); *G10L 25/03* (2013.01)

(58) Field of Classification Search
  CPC .......... G10L 15/20; G10L 15/16; G10L 25/03
  USPC ...................................................... 704/226
  See application file for complete search history.

(56) References Cited

U.S. PATENT DOCUMENTS

| | | | | |
|---|---|---|---|---|
| 10,846,828 B2* | 11/2020 | Meyer | ..................... | G06T 5/002 |
| 10,970,645 B1* | 4/2021 | Kim | ..................... | G06K 9/6273 |
| 2009/0115635 A1* | 5/2009 | Berger | ..................... | G10L 25/51 |
| | | | | 340/943 |
| 2011/0169664 A1* | 7/2011 | Berger | ..................... | G08G 1/015 |
| | | | | 340/943 |
| 2018/0293496 A1* | 10/2018 | Vogels | ..................... | G06N 3/0472 |
| 2018/0293711 A1* | 10/2018 | Vogels | ..................... | G06K 9/6256 |
| 2019/0251668 A1* | 8/2019 | Meyer | ..................... | G06T 5/002 |
| 2019/0304067 A1* | 10/2019 | Vogels | ..................... | G06T 15/506 |
| 2019/0304068 A1* | 10/2019 | Vogels | ..................... | G06N 5/046 |
| 2020/0027198 A1* | 1/2020 | Vogels | ..................... | G06V 10/30 |
| 2020/0184605 A1* | 6/2020 | Vogels | ..................... | G06K 9/627 |
| 2020/0312313 A1* | 10/2020 | Maddali | ..................... | G10L 15/197 |

* cited by examiner

*Primary Examiner* — Akwasi M Sarpong
(74) *Attorney, Agent, or Firm* — Young Basile Hanlon & MacFarlane, P.C.

(57) ABSTRACT

A method includes extracting, from a frame of the audio sample, spectral features indicative of cochlear impulse response of an auditory system; obtaining an estimate of a speech signal in the frame from a neural network that is trained, during a training phase, to accept the spectral features as input and output the estimate of the speech signal, where the estimate of the speech signal includes reverberation and excludes noise present in the frame; mapping the estimate of the speech signal to a frequency domain of the frame using mapping parameters obtained during the training phase to obtain an estimate of a reverberant speech spectrum in the frame; and obtaining, from a time-distributed neural network, a dereverberant frame of the frame, where the estimate of the reverberant speech spectrum in the frame is used as an input to the time-distributed neural network.

20 Claims, 6 Drawing Sheets

SIMULTANEOUS DEREVERBERATION AND DENOISING VIA LOW LATENCY DEEP LEARNING

CROSS REFERENCES TO RELATED APPLICATIONS

None.

TECHNICAL FIELD

This disclosure relates generally to speech enhancement and more specifically to simultaneous dereverberation and denoising in real-time applications.

BACKGROUND

Many interactions occur online over different communication channels and via many media types. An example of such interactions is real-time communication using video conferencing or streaming or a simple telephone voice call. The video can include audio (e.g., speech) and visual content. One user (i.e., a sending user) may transmit (e.g., the video) to one or more receiving users. For example, a concert may be live-streamed to many viewers. For example, a teacher may live-stream a classroom session to students. For example, a few users may hold a live chat session that includes live video.

Audio signals (e.g., speech) in such real-time communication can be corrupted by reverberation and background noise. Reverberation can be created by the multiple reflections and ultimate decay of a sound or signal as the sound or signal is absorbed by objects (e.g., walls, furniture, etc.) in a space (e.g., a room, a hall, etc.). Background noise can result from an interference acoustic source. Both the reverberation and the background noise can lead to the degradation in audio (e.g., speech) quality and intelligibility.

SUMMARY

A first aspect is a method for denoising and dereverbating an audio sample. The method includes extracting, from a frame of the audio sample, spectral features indicative of cochlear impulse response of an auditory system; obtaining an estimate of a speech signal in the frame from a neural network that is trained, during a training phase, to accept the spectral features as input and output the estimate of the speech signal, where the estimate of the speech signal includes reverberation and excludes noise present in the frame; mapping the estimate of the speech signal to a frequency domain of the frame using mapping parameters obtained during the training phase to obtain an estimate of a reverberant speech spectrum in the frame; and obtaining, from a time-distributed neural network, a dereverberant frame of the frame, where the estimate of the reverberant speech spectrum in the frame is used as an input to the time-distributed neural network.

A second aspect is a system for denoising and dereverbating an audio sample. The system includes a noise reduction module, an adaptive mapping module, and a dereverberation module. The noise reduction module is configured to extract spectral features from a frame of the audio sample indicative of cochlear impulse response of an auditory system; and obtain an estimate of a speech signal in the frame from a first neural network that is trained, during a training phase, to accept the spectral features as input and output the estimate of the speech signal, wherein the estimate of the speech signal includes reverberation and excludes noise present in the frame. The adaptive mapping module is configured to map, using mapping parameters obtained during the training phase, the estimate of the speech signal to a frequency domain of the frame to obtain an estimate of a reverberant speech spectrum in the frame. The dereverberation module is configured to obtain a dereverberant frame of the frame from a time-distributed neural network, wherein the estimate of the reverberant speech spectrum in the frame is used in an input to the time-distributed neural network.

A third aspect is an apparatus that includes a processor. The processor is configured to extract, from a frame of an audio sample, spectral features indicative of cochlear impulse response of an auditory system; obtain an estimate of a speech signal in the frame from a neural network that is trained, during a training phase, to accept the spectral features as input and output the estimate of the speech signal, where the estimate of the speech signal includes reverberation and excludes noise present in the frame; map the estimate of the speech signal to a frequency domain of the frame using mapping parameters obtained during the training phase to obtain an estimate of a reverberant speech spectrum in the frame; and obtain, from a time-distributed neural network, a dereverberant frame of the frame, where the estimate of the reverberant speech spectrum in the frame is used as an input to the time-distributed neural network.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

BRIEF DESCRIPTION OF THE DRAWINGS

The description herein makes reference to the accompanying drawings wherein like reference numerals refer to like parts throughout the several views.

DETAILED DESCRIPTION

As mentioned above, audio signals (e.g., speech) can be corrupted by reverberation and/or background noise. Many denoising and dereverberation techniques have been developed. However, especially in real-time communication (e.g., in a real-time video communication), such techniques can cause undesirable delays and latency because these techniques may require an unreasonable amount of time or compute resources to execute.

Deep learning techniques according to this disclosure can effectively and simultaneously remove blurring effects caused by reverberation and suppress ambient noise in audio signals. Removing (or at least reducing) transient noise (i.e., background noise) and counteracting the impact of the, e.g., room impulse response (i.e., reverberation) can be effectively and simultaneously handled (e.g., removed, suppressed, etc.) even when such transient noise or the room impulse change dynamically. The deep learning techniques described herein can be used to apply a low-latency dereverberation and denoising algorithm in real-time applications, such as video conferencing. Such techniques can be employed at a user device, such as a smartphone, a handheld device, or the like, which may have limited compute resources.

The techniques described herein can be used at a sending user's device (i.e., a sending device), a receiving user's device (e.g., a receiving device), or both. The sending user, as used herein, is a person who may be speaking and whose speech is to be transmitted to and heard by the receiving user. The sending user's speech may be corrupted by background noise and/or reverberation. The techniques described can also be employed by a central server (e.g., a cloud based server) that may receive an audio signal from a sending user and relay the audio signal to the receiving user.

Machine learning (ML) is used to denoise and dereverberate (i.e., remove reverberations from) audio signals (e.g., speech signals). Aspects of this disclosure can be thought as being divided into two parts. A first part is for reducing background noise and a second part is for dereverberation. However, as will become clear, implementations of this disclosure perform the denoising and the dereverberation as a whole. That is, the denoising and the dereverberation are simultaneously performed.

As is known, machine learning involves a training phase (e.g., stage, etc.) and an inference (e.g., classification, use, production, etc.) phase. Typically, whatever machine learning model is trained during the training phase is itself used during the inference phase. However, to reduce complexity, and as becomes clearer below, while several ML models are trained during the training phase, less than all of the trained ML models are used during the inference phase to reduce noise and reverberations in real-time applications (such as audio or video conferencing).

Figure 1:
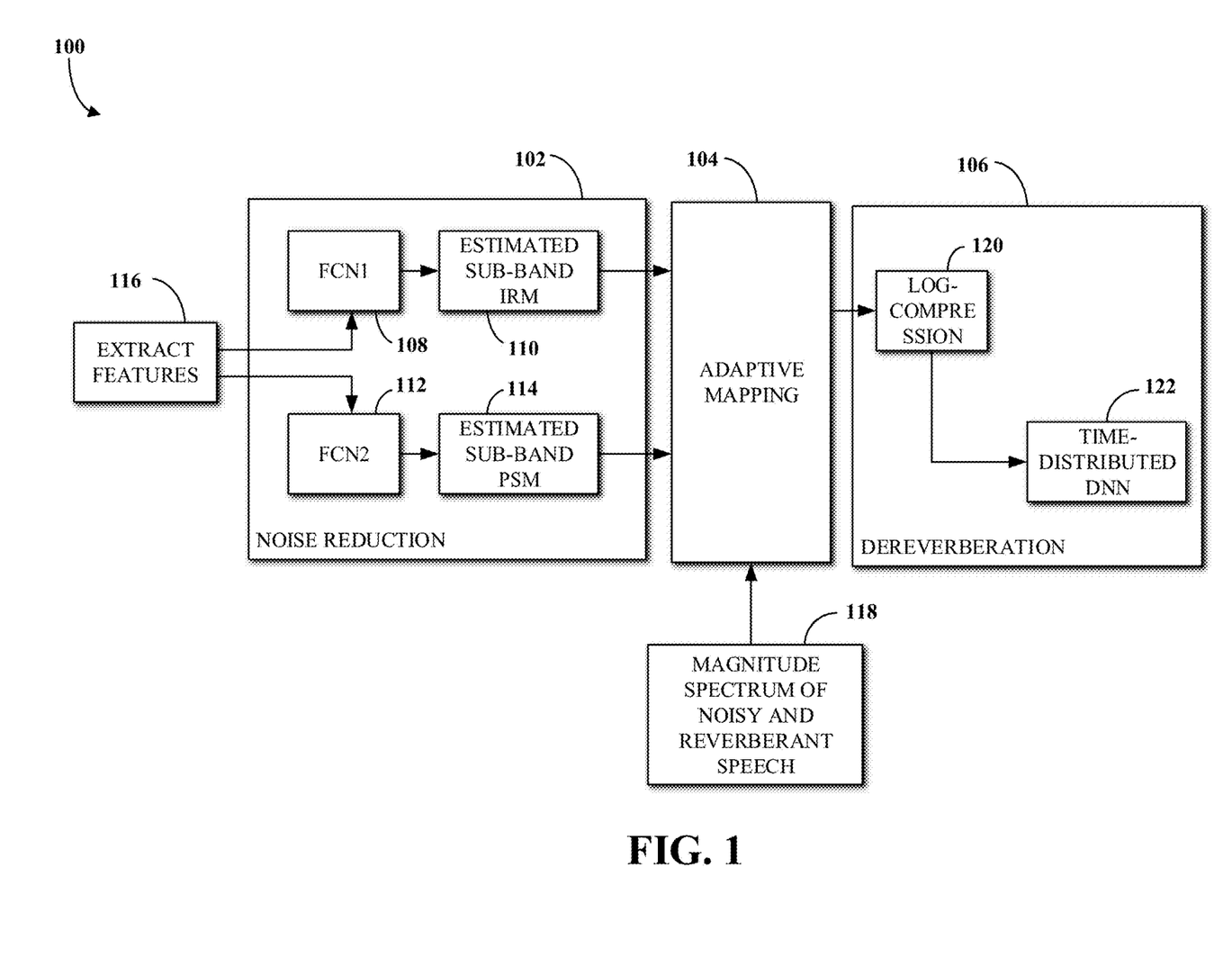
FIG. 1 is a diagram of an example of a technique of a training phase for denoising and dereverberation of real-time audio according to implementation of this disclosure.

FIG. 1 is a diagram of an example of a technique 100 of a training phase for denoising and dereverberation of real-time audio according to implementation of this disclosure. The technique 100 receives training data. The training data include noisy and reverberant data samples (e.g., noisy and reverberant speech samples, also referred to herein as mixture speech) and corresponding reference samples (e.g., anechoic and clean speech).

The technique 100 includes a feature extraction stage that includes a module 116 and a module 118, a noise reduction phase 102, an adaptive mapping phase 104, and a dereverberation phase 106. Given a training mixture speech datum, the technique 100 can partition the training mixture speech into frames. Each frame can be 10 milliseconds, 50 milliseconds, shorter, or longer in duration. At least some of the frames (e.g., each frame) are then process by the technique 100.

To illustrate, and without loss of generality, in an implementation, the technique 100 can be summarized as performing the steps (e.g., phases, stages, etc.) of 1) extracting gammatone features from the mixture speech (i.e., from audio frames therein) and extracting the Fast Fourier Transform (FFT) spectrograms from the corresponding anechoic and clean speech (i.e., the corresponding audio frames therein), 2) training, in parallel, two neural networks for speech and noise separation with respect to the Equivalent Rectangular Bandwidth (ERB)-spaced sub-bands, 3) tuning adaptive parameters for the gain mapping with respect to the FFT spectrogram of the mixture speech, and 4) training a time-distributed deep neural network (TD-DNN) to remove the late reverberation.

The operation of the technique 100 is described with respect to one frame (referred to herein as the "current frame") of a training datum. However, it should be understood that the same operations can be applied to each frame of training data.

The module 116 can be used to extract short-term spectral features of the acoustic waveform from the current frame. The spectral features can be indicative of cochlear impulse response of an auditory system. In an example, a bandpass filter can be used to extract the short-term spectral features from the current frame. In an example, a gammatone filter bank can be used. In an example, a 64-filter bank can be used. Thus, 64 channel gammatone features can be extracted from the current frame. The gammatone filter bank represents the cochlear impulse response of the auditory system. That is, the gammatone filter bank can approximate the auditory response of nerve fibers. The gammatone filter has the impulse response of Formula (1):

$$h_i(t) = \begin{cases} At^{n-1}\exp(-2\pi b_i t)\cos(2\pi f_i t + \varphi_i) & \text{for } t > 0 \\ 0 & \text{otherwise} \end{cases} \quad (1)$$

In Formula (1), A denotes the amplitude of the audio signal of the frame; n denotes the filter order, which largely determines the slope of the filter's skirts; $b_i$ (in Hertz) denotes the bandwidth and controls the duration of the impulse response function; $f_i$ (in Hertz) denotes the center frequency of the carrier, and $\varphi_i$ (in radians) denotes the phase of the carrier. The bandwidth $b_i$ can be $b_i=1.019\text{ERB}(f_i)$, where ERB represents the Equivalent Rectangular Bandwidth. The impulse response of the gammatone filter bank can provide a good fit for the motion of the basilar membrane within the cochlear.

As mentioned above, the current frame can be filtered through a 64-channel gammatone filter bank with different center frequencies, $f_i$, to obtain the corresponding features. As such, 64 features can be obtained for the current frame. The gammatone filter bank is normally defined in such a way that the filter center frequencies are distributed across frequency in proportion to their bandwidth, known as the ERB scale.

The extracted features from the gammatone filter bank can be used as input to the noise reduction phase 102. The noise reduction module in the training stage (i.e., in the technique 100) aims at separating the additive noise and speech through estimating the ERB gains for each sub-band (i.e., each frequency bin) of the current frame. The ERB scale, as a nonlinear frequency scale, can be based on the human auditory system. The ERB scale presents narrow resolution at low frequencies and coarse resolution at high frequencies. As such, using the ERB gains can effectively preserve the speech harmonics and suppress the noise in the mixture speech. Additionally, as compared to a Short-time Fourier Transform (STFT) time-frequency representation, the use of the gammatone features and the ERB gains can greatly reduce the computational complexity and the number of nodes required in neural networks that use STFT features as inputs to such neural networks. For example, the computation needed to calculate the first layer of the network from the input would be increased because the STFT have more features than the gammatone filter.

The noise reduction phase 102 includes a first deep-feature convolution neural network (i.e., an FCN1 108) and a second deep-feature convolution neural network (i.e., an FCN2 112). A structure of each of the FCN1 108 and the FCN2 112 is described with respect to FIG. 5. The FCN1 108 and the FCN2 112 are trained together with the loss function of mean squared error between the predicted speech only gammatone features and the speech only gammatone features of the reference sample.

The FCN1 108 is used for estimating the noise that exists in the frame of the mixture speech. Thus, the output of the FCN1 108 is an estimate of noise in the speech signal (i.e., the audio frame) from which the gammatone features are extracted and input into the FCN1 108. As such, the FCN1 108 is trained to learn a mapping from the gammatone features to the noise estimate. Said another way, the FCN1 108 generates a mask for noise signal gammatone features. In an example, the estimate of the noise can be an estimate of the ideal ratio mask (IRM). The IRM represents a spectral noise gain with respect of each of the sub-bands (or frequency bins) of the signal of the current frame. That is, the FCN1 108 can be trained to learn a mapping from the gammatone features of the frames of the training samples to the IRM for each of the sub-bands (i.e., collectively, IRMs 110). Thus, the IRMs 110 includes an IRM for each of the sub-bands. Each of the masks of the of IRMs 110 can be a 64-dimensional mask. The sub-band gain in a frequency bin can be, or can be an estimate of, the ratio of the clean (i.e., reference) audio frame to the noisy frame (i.e., the current frame). The IRM can produce a high improvement in the intelligibility when applied to a noisy speech. In an example, the IRM to be estimated can be given by Formula (2). However, other IRM masks are possible.

$$IRM = \left(\frac{S(t,f)^2}{S(t,f)^2 + N(t,f)^2}\right)^\beta \quad (2)$$

In Formula (2), $S(t, f)^2$ and $N(t, f)^2$ denote the speech energy and the noise energy within a time-frequency unit, respectively; the parameter $\beta$ can be used to scale the mask. In an example, $\beta$ can be 0.5.

The FCN2 112 is used for estimating the speech (i.e., the noiseless speech) that exists in the frame of the mixture speech. The noiseless speech can include reverberation and is, thus, referred to as reverberant speech. Thus, the output of the FCN2 112 is an estimate of reverberant speech in the speech signal (i.e., the current frame) from which the gammatone features are extracted and input into the FCN2 112. Said another way, the FCN2 112 generates a mask for speech signal gammatone features. In an example, the estimate of the speech can be an estimate of the phase-sensitive mask (PSM). The PSM is a time-frequency mask that implicitly represents phase-related information. The PSM is defined on the STFT (short-time Fourier transform) magnitudes of clean speech and noisy speech. That is, the FCN2 112 can be trained to learn a mapping from the gammatone features of the frames of the training samples to the PSM for each of the sub-bands (i.e., collectively, PSMs 114). Thus, the PSMs 114 includes a PSM for each of the sub-bands. Each of the masks of the PSMs 114 can be a 64-dimensional mask. The sub-band gain in a frequency bin can be, or can be an estimate of, the ratio of the clean (i.e., reference) audio frame to the noisy frame (i.e., the current frame). In an example, the PSM to be estimated can be given by Formula (3). However, other PSM masks are possible.

$$PSM(t, f) = \frac{|S(t,f)|}{|Y(t,f)|}\cos\theta \quad (3)$$

In Formula (3), $|S(t, f)|$ and $|Y(t, f)|$ represent spectral magnitudes of clean speech (i.e. the reference frame corresponding to the current frame) and noisy speech (i.e., the current frame), respectively; and $\theta$ denotes the difference of the clean speech (i.e. the reference frame corresponding to the current frame) phase and the noisy speech (i.e., the current frame) phase within the a time-frequency unit.

To reiterate, the FCN1 108 is used to generate the mask for noise signal gammatone features and the FCN2 112 is used to generate the mask for speech signal gammatone features. The FCN1 108 and the FCN2 112 can be trained together with respective loss functions of a summation of mean squared errors (MSE). A first loss function used to train the FCN2 112 can be the MSE between the predicted speech only gammatone features and the speech only gammatone features of reference samples. A second loss function used to train the FCN1 108 can be the MSE between the predicted noise only gammatone features and the noise only gammatone features of the reference samples.

As mentioned above, speech gains of the ERB-spaced sub-bands are obtained from the noise reduction phase 102. Rather than directly applying the gains into the corresponding sub-bands, the gains can be mapped back to the Fourier domain, such as the STFT domain, by the adaptive mapping phase 104. During the training phase, the adaptive mapping phase 104 obtains (e.g., tunes, optimizes, etc.) mapping parameters $\{\beta_{i-1,j}\ \beta_{i,j}\ \beta_{i+1,j}\}$ which are further described below. (The mapping parameters can be fixed parameters and can be tuned empirically (e.g., by trial and error), for example by searching the possible range, which is defined in Equation (4) to minimize the converged loss. The mapping parameters $\{\beta_{i-1,j}\ \beta_{i,j}\ \beta_{i+1,j}\}$ can satisfy the following conditions.

$$\begin{cases} 0 \le \beta_{i-1,j} \le 1 \\ 0 \le \beta_{i,j} \le 1 \\ 0 \le \beta_{i+1,j} \le 1 \\ \beta_{i-1,j} + \beta_{i,j} + \beta_{i+1,j} = 1 \end{cases} \quad (4)$$

While three mapping parameters are described herein, more or fewer mapping parameters can be used. The indices (i.e., i and j) of the parameters of Equation (4) are further described below with respect to Formula (5). As described below with respect to FIG. 5, the output of the FCN2 112 (and the FCN1 108) has the same dimensionality as the input to the FCN2 112 (and the FCN1 108). As the masks (i.e., the PSMs 114) are obtained for the sub-bands from the FCN2 112, then 64 sub-bands are obtained because 64 gammatone features are obtained from the module 116 and used as input to the FCN2 112. The output of FCN2 112 is the 64 dimensional masks, the PSMs 114. The PSMs 114 are masks that correspond to the 64 sub-bands. However, what is desired are the gains for each frequency bin of the spectrogram, such as the FFT spectrogram because the final output would be computed from that spectrogram (e.g., the FFT spectrogram). The FFT spectrogram can be obtained using the module 118. That is, the module 118 can receive the current frame and extract the FFT spectrogram from the current frame, which is noisy and reverberant speech. That is, the module 118 can extract noise frequencies and reverberation frequencies from the current frame.

The gain with respect to each frequency bin within a sub-band can be estimated from the corresponding sub-band as shown in Formula (5). Suppose that the $i^{th}$ ERB subband consists of K frequency bins, the gain of the $j^{th}$ frequency bin within this subband, denoted as $g_{ij}$, can be obtained as follows:

$$g_{ij} = \beta_{i-1,j} G_{i-1} + \beta_{i,j} G_i + \beta_{i+1,j} G_{i+1} \qquad (5)$$

The Adaptive Mapping phase 104 can use the output of the FCN1 108 during training as follows. The FCN1 108 and the FCN2 112 provide the magnitude gains and phase factors, which will change the magnitude and phase of the gammatone features respectively. The magnitude gains (e.g., $MG_i$) and phase factors (e.g., $PF_i$) together can provide the gains of the gammatone features ($G_i$) through $G_i = MG_i * PF_i$. The Adaptive Mapping phase 104 can then use the gains of gammatone features as described in Formula (5).

Figure 2:
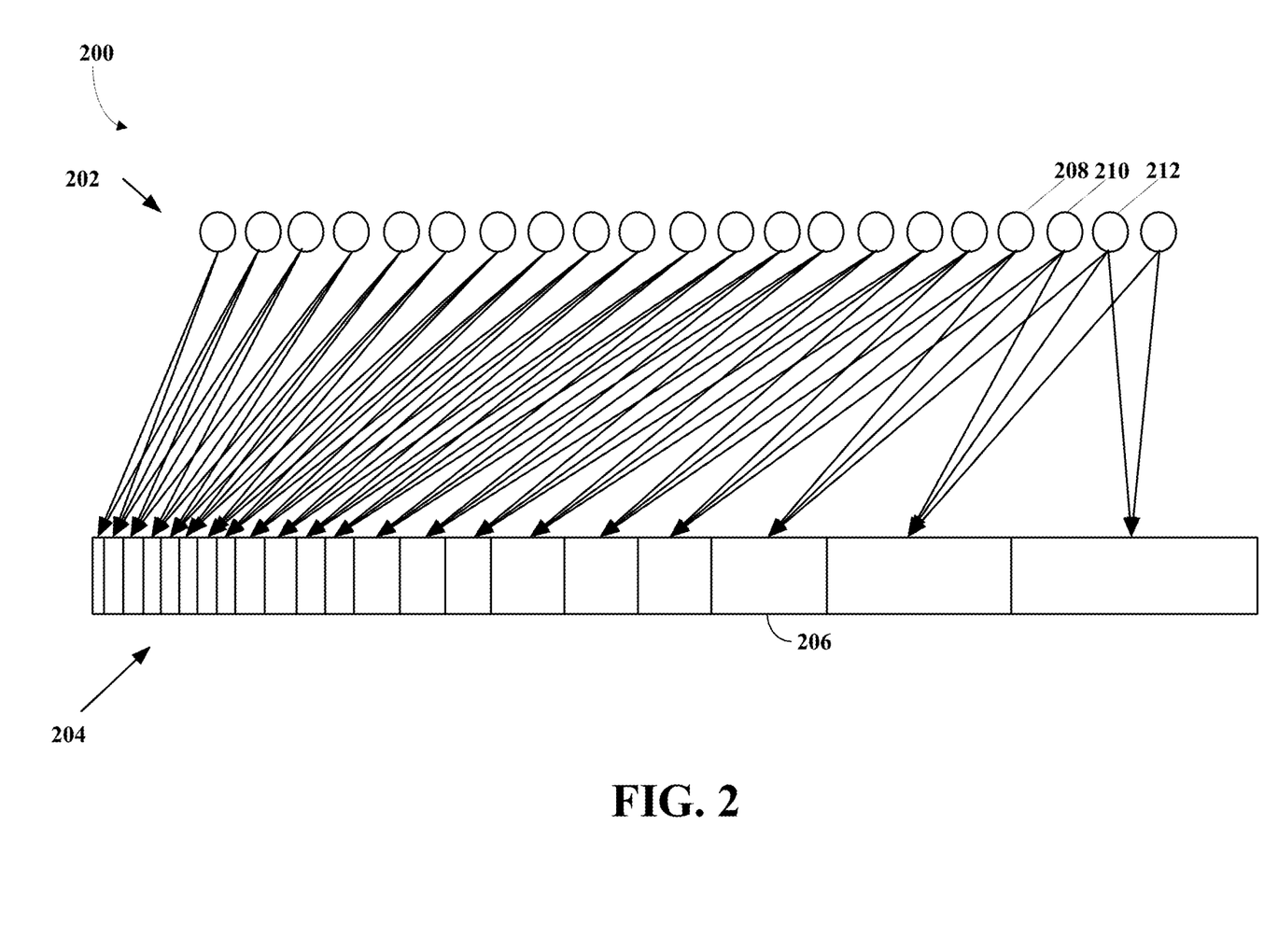
FIG. 2 illustrates an example of mapping sub-band gains to frequency bins according to implementations of this disclosure.

FIG. 2 illustrates an example 200 of mapping sub-band gains to frequency bins according to implementations of this disclosure. The example 200 illustrates the operation of Formula (5). The example 200 illustrates the mapping mode of the gains computed from the gammatone features to the full FFT spectrogram. The example 200 includes ERB sub-band gains 202 of a PSM mask (i.e., ERB gain or a mask of the PSMs 114) as obtained from the FCN2 112 and frequency bin magnitudes of an FFT spectrogram 204 that are obtained from the module 118. The gain ($g_{ij}$) of the in a frequency bin 206 of an ERB sub-band gain 210 can be calculated, using the mapping parameters, as a weighted sum, using Formula (5), of the ERB sub-band gain 210 (i.e., $G_i$), an ERB sub-band gain 208 (i.e., $G_{i-1}$), and an ERB sub-band gain 212 (i.e., $G_{i+1}$).

Returning again to FIG. 1, the output of the adaptive mapping phase 104 are the estimated full-band noise gains in the FFT domain, which can be used to obtain an enhanced frame. To obtain the enhanced speech (i.e., an enhanced current frame), the full-band gains can be multiplied by the noisy speech (i.e., the current frame). More specifically, the magnitude spectrogram of the noisy and reverberant current frame can be multiplied by the corresponding full-band gains to obtain the enhanced frame. The enhanced frame refers to the current frame that has been denoised by is still reverberant. As such, after the adaptive mapping stage, the estimated full-band gains can be applied to the magnitude spectrogram of the noisy and reverberant speech (i.e., the current frame) to obtain an estimate of the magnitude spectrogram of the reverberant speech.

The dereverberation phase 106 includes a log-compression module 120 and a time-distributed deep neural-network (i.e., a TDDNN 122). In some implementations, the dereverberation phase 106 does not include the log-compression module 120.

The log-compression module 120 can be used to compute the log compression of the magnitude spectrogram of the enhanced speech. The log-compression module 120 can be used to reduce the dynamic range of the values in the magnitude spectrogram. As such, instead of processing in the linear scale, processing in the log-scale can reduce the dynamic range.

During the training phase of the technique 100, the TDDNN 122 can be trained to achieve spectral mapping from the spectrogram of the predicted reverberant frame (i.e., the enhanced frame) to the clean and anechoic speech frame (i.e., the reference frame). In an example, the TDDNN 122 can receive, as input, log-compressed features of the current frame. More specifically, the TDDNN 122 receives the log-compressed estimate of the magnitude spectrogram of the enhanced frame (e.g., the denoised but still reverberant frame). The output of the TDDNN 122 is an estimate of the spectrum of a clean frame. The clean frame is a denoised and dereverberant frame of the current frame.

In an example, the TDDNN 122 can be a time-distributed fully-connected deep neural network with three hidden layers and one linear output layer. As is known, a time-distributed neural network maintains an internal state that represents context information about past inputs for an amount of time that is not fixed a priori but that depends on the weights that are learned during training and on the input data. As is also known, a time-distributed network can transform an input sequence into an output sequence while taking into account contextual information (i.e., the internal state). As such, no context information (e.g., the features of one or more frames that precede the current frame) need be explicitly input to the TDDNN 122 along with the current frame. Thus, by reducing the number of inputs to the TDDNN 122, the complexity of the TDDNN 122 can be reduced.

Figure 3:
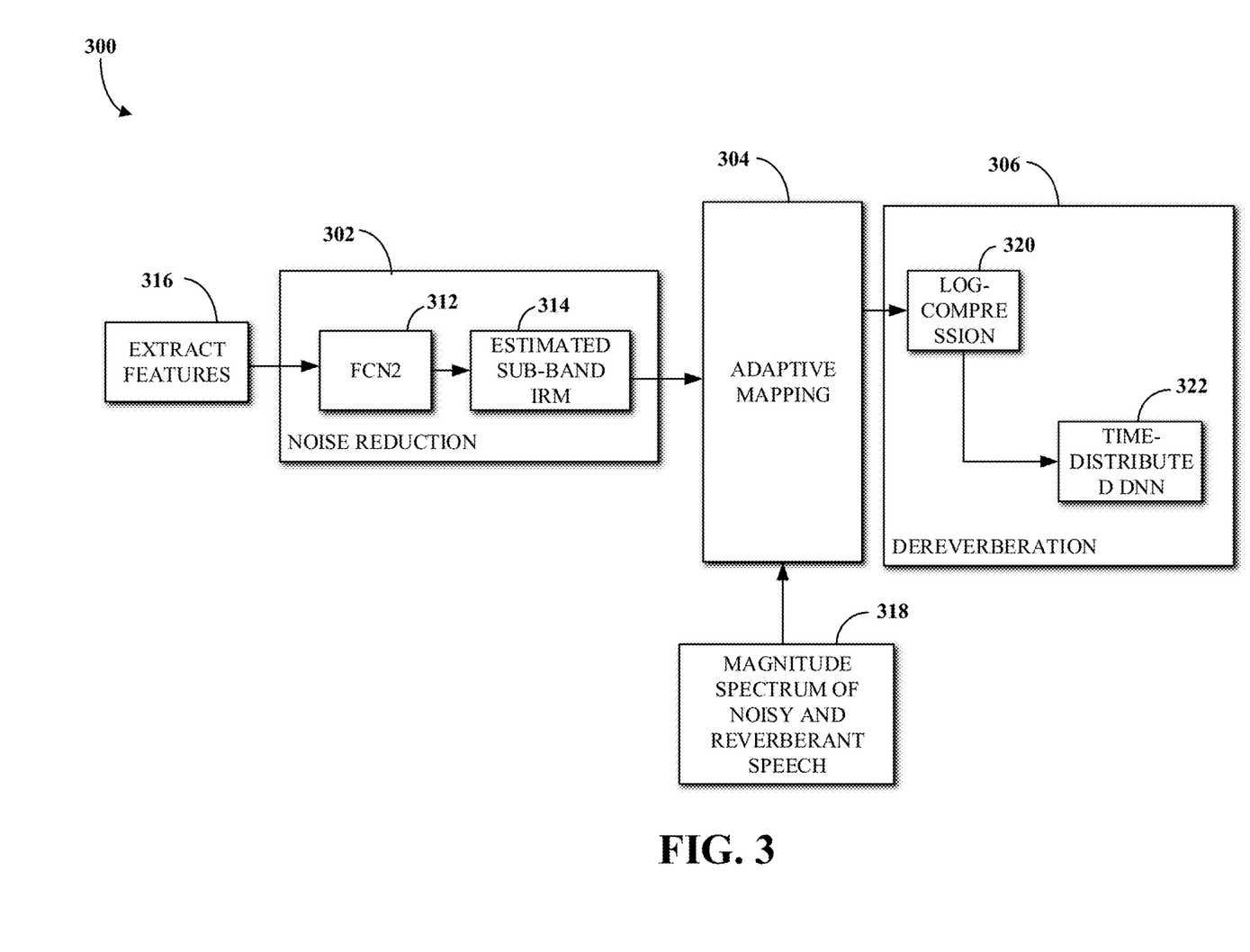
FIG. 3 is a diagram of an example of a technique for denoising and dereverberation of real-time audio according to implementation of this disclosure.

FIG. 3 is a diagram of an example of a technique 300 for denoising and dereverberation of real-time audio according to implementation of this disclosure. The technique 300 can be used in real-time applications, such as audio and/or video conferencing, telephone conversations, and the like, to denoise and dereverberate speech that is exchanged between communicating parties or communicated from one sending user to one or more receiving users. The technique 300 can be implemented by a sending device. Thus, the speech from the speaker can be denoised and dereverberated on the device of the sending user, before transmission to a receiving user, so that the receiving user can receive clean speech (i.e., denoised and dereverberated speech). The technique 300 can be implemented by a receiving device. Thus, the speech received at the receiving device of a receiving user can be noisy and reverberant. The technique 300 can be performed on the received speech to produce clean speech (i.e., denoised and dereverberant speech). The clean speech is then output to the receiving user. The technique 300 can be implemented by a central server, which receives mixture speech from a sending device, performed the technique 300 to obtain clean and anechoic speech, and transmit (e.g., forward, relay, etc.) the clean and anechoic speech to one or more. The technique 300 can be implemented by a computing device, such as the computing device described with respect to FIG. 4.

The technique 300 includes phases similar to those described with respect to the training technique, the technique 100, of FIG. 1. Thus, the technique 300 includes a feature extraction phase that includes a module 316 and a module 318, which can be as described with respect to a module 116 and a module 118 of FIG. 1, respectively; a noise reduction phase 302; an adaptive mapping phase 304; and a dereverberation phase 306.

The technique 300 uses at least some of the components that are trained as described with respect to the technique 100 of FIG. 1. Namely, the noise reduction phase 302 uses an FCN2 312, which uses the parameters of the trained FCN2 112 of FIG. 1; the adaptive mapping phase 304 uses the mapping parameters that are tuned by the adaptive mapping 104 of FIG. 1; and the dereverberation phase 306 uses a log-compression module 320, which can be as described with respect to the log-compression module 120 of FIG. 1, and a TDDNN 322, which uses the parameters of the trained TDDNN 122 of FIG. 1.

In an implementation, and without loss of generality, the technique 300 can be described as performing the steps of 1) extracting 64-channel gammatone features for each current frame of a received mixture speech (i.e., a noisy and reverberant speech); 2) employing the trained FCN2 for speech estimation; 3) applying the adaptive gain mapping to obtain a predicted reverberant speech spectrogram in a current frame; 4) applying log-scale compression to the predicted reverberant speech spectrogram; and 5) utilizing the time-distributed fully connected deep neural network (i.e., the TDDNN 322) to estimate the clean speech spectrum in each current frame.

With the well-established neural networks and frozen parameters from the training stage (i.e., the technique 100 of FIG. 1), the technique 300 can effectively achieve monaural dereverberation and denoising simultaneously. The technique 300 can be implemented frame by frame and in a causal way. The 64-channel gammatone features can be extracted for a current frame and concatenated with the corresponding features in the context window to form the input for the FCN2 312. With respect to the gammatone filter, each gammatone feature can be calculated by multiply the FFT spectrum with a context window, which is as defined in Formula (1).

The predicted ERB-sub-band gains can then be mapped into the STFT domain with the frozen parameters $\{\beta_{i-1,j} \beta_{i,j} \beta_{i+1,j}\}$. The multiplication of mixture speech spectrum with respect to the current frame and the predicted gains can be utilized as the estimate for the reverberant speech spectrum. With the log-scale compression, the estimated speech spectrum with respect to the current frame is then utilized as the input to the time-distributed fully-connected deep neural network to achieve dereverberation It is noted that the adaptive mapping phase 104 of FIG. 1 (i.e., during training) receives inputs from the FCN1 108 and the FCN2 112. However, during inference (i.e., in real-time use), the technique 302 does not use a corresponding component to the FCN1 108. In the technique 300, only the FCN2 312 is used. The FCN 312 is used for dereverberation. The output of the FCN2 312 is used directly as the input ($G_i=PF_i$) the adaptive mapping phase 312.

Figure 4:
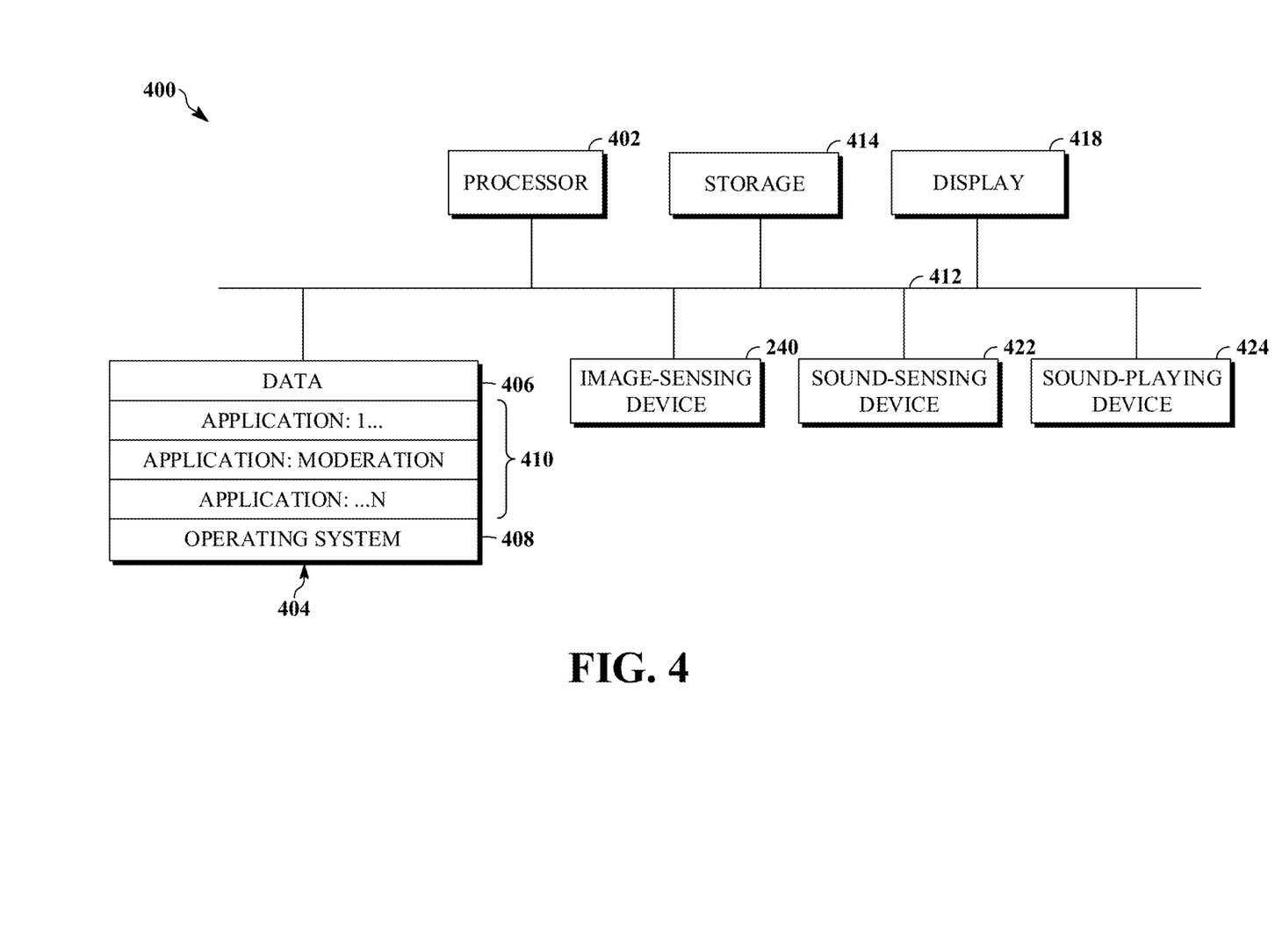
FIG. 4 is a block diagram of an example of a computing device in accordance with implementations of this disclosure.

FIG. 4 is a block diagram of an example of a computing device 400 in accordance with implementations of this disclosure. The computing device 400 can be in the form of a computing system including multiple computing devices, or in the form of one computing device, for example, a mobile phone, a tablet computer, a laptop computer, a notebook computer, a desktop computer, and the like.

A processor 402 in the computing device 400 can be a conventional central processing unit. Alternatively, the processor 402 can be another type of device, or multiple devices, capable of manipulating or processing information now existing or hereafter developed. For example, although the disclosed implementations can be practiced with one processor as shown (e.g., the processor 402), advantages in speed and efficiency can be achieved by using more than one processor.

A memory 404 in computing device 400 can be a read only memory (ROM) device or a random access memory (RAM) device in an implementation. However, other suitable types of storage devices can be used as the memory 404. The memory 404 can include code and data 406 that are accessed by the processor 402 using a bus 412. The memory 404 can further include an operating system 408 and application programs 410, the application programs 410 including at least one program that permits the processor 402 to perform at least some of the techniques described herein. For example, the application programs 410 can include applications 1 through N, which further include applications and techniques useful in simultaneous dereverberation and denoising. For example the application programs 410 can include the technique 100 or aspects thereof, to implement a training phase. For example, the application programs 410 can include the technique 300 or aspects thereof to implement real-time dereverberation and denoising. The computing device 400 can also include a secondary storage 414, which can, for example, be a memory card used with a mobile computing device.

The computing device 400 can also include one or more output devices, such as a display 418. The display 418 may be, in one example, a touch sensitive display that combines a display with a touch sensitive element that is operable to sense touch inputs. The display 418 can be coupled to the processor 402 via the bus 412. Other output devices that permit a user to program or otherwise use the computing device 400 can be provided in addition to or as an alternative to the display 418. When the output device is or includes a display, the display can be implemented in various ways, including by a liquid crystal display (LCD), a cathode-ray tube (CRT) display, or a light emitting diode (LED) display, such as an organic LED (OLED) display.

The computing device 400 can also include or be in communication with an image-sensing device 420, for example, a camera, or any other image-sensing device 420 now existing or hereafter developed that can sense an image such as the image of a user operating the computing device 400. The image-sensing device 420 can be positioned such that it is directed toward the user operating the computing device 400. In an example, the position and optical axis of the image-sensing device 420 can be configured such that the field of vision includes an area that is directly adjacent to the display 418 and from which the display 418 is visible.

The computing device 400 can also include or be in communication with a sound-sensing device 422, for example, a microphone, or any other sound-sensing device now existing or hereafter developed that can sense sounds near the computing device 400. The sound-sensing device 422 can be positioned such that it is directed toward the user operating the computing device 400 and can be configured to receive sounds, for example, speech or other utterances, made by the user while the user operates the computing device 400. The computing device 400 can also include or be in communication with a sound-playing device 424, for example, a speaker, a headset, or any other sound-playing device now existing or hereafter developed that can play sounds as directed by the computing device 400.

Although FIG. 4 depicts the processor 402 and the memory 404 of the computing device 400 as being integrated into one unit, other configurations can be utilized. The operations of the processor 402 can be distributed across multiple machines (wherein individual machines can have one or more processors) that can be coupled directly or across a local area or other network. The memory 404 can be distributed across multiple machines such as a network-based memory or memory in multiple machines performing the operations of the computing device 400. Although depicted here as one bus, the bus 412 of the computing device 400 can be composed of multiple buses. Further, the secondary storage 414 can be directly coupled to the other components of the computing device 400 or can be accessed via a network and can comprise an integrated unit such as a memory card or multiple units such as multiple memory cards. The computing device 400 can thus be implemented in a wide variety of configurations.

Figure 5:
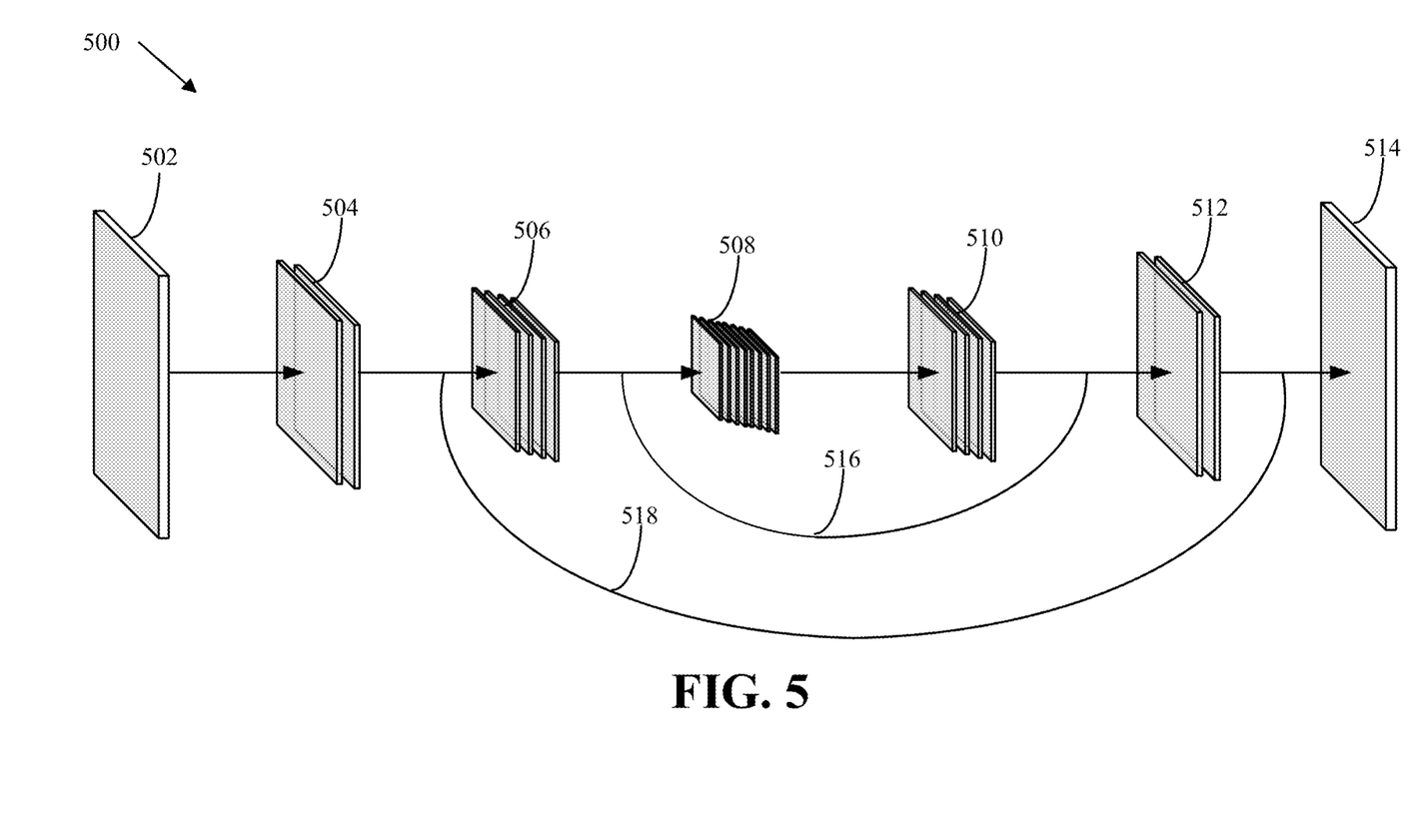
FIG. 5 is an example of a structure of a deep-feature convolution neural network according to implementations of this disclosure.

FIG. 5 is an example 500 of a structure of a deep-feature convolution neural network (CNN) according to implementations of this disclosure. The FCN1 108 and the FCN2 112 of FIG. 1 and the FCN2 312 of FIG. 3 can each have the structure of the example 500. However, other structures are possible.

In a CNN, a feature extraction portion typically includes a set of convolutional operations, which is typically a series of filters that are used to filter an input (e.g., an image, an audio frame of an audio sample, etc.) based on a filter (typically a square of size k, without loss of generality). For example, and in the context of audio enhancement, these filters can be used to find features in an input audio frame. As the number of stacked convolutional operations increases, later convolutional operations can find higher-level features.

In the CNN, a classification portion is typically a set of fully connected layers. The fully connected layers can be thought of as looking at all the input features of an audio frame in order to generate a high-level classifier. Several stages (e.g., a series) of high-level classifiers eventually generate the desired classification output.

As mentioned, a typical CNN network can be composed of a number of convolutional operations (e.g., the feature-extraction portion) followed by a number of fully connected layers. The number of operations of each type and their respective sizes is typically determined during a training phase of the machine learning. As a person skilled in the art recognizes, additional layers and/or operations can be included in each portion. For example, combinations of Pooling, MaxPooling, Dropout, Activation, Normalization, BatchNormalization, and other operations can be grouped with convolution operations (i.e., in the features-extraction portion) and/or the fully connected operation (i.e., in the classification portion). The fully connected layers may be referred to as Dense operations. As a person skilled in the art recognizes, a convolution operation can use a SeparableConvolution2D or Convolution2D operation.

A convolution layer can be a group of operations starting with a Convolution2D or SeparableConvolution2D operation followed by zero or more operations (e.g., Pooling, Dropout, Activation, Normalization, BatchNormalization, other operations, or a combination thereof), until another convolutional layer, a Dense operation, or the output of the CNN is reached. Similarly, a Dense layer can be a group of operations or layers starting with a Dense operation (i.e., a fully connected layer) followed by zero or more operations (e.g., Pooling, Dropout, Activation, Normalization, BatchNormalization, other operations, or a combination thereof) until another convolution layer, another Dense layer, or the output of the network is reached. The boundary between feature extraction based on convolutional networks and a feature classification using Dense operations can be marked by a Flatten operation, which flattens the multidimensional matrix from the feature extraction into a vector.

In a typical CNN, each of the convolution layers may consist of a set of filters. While a filter is applied to a subset of the input data at a time, the filter is applied across the full input, such as by sweeping over the input. The operations performed by this layer are typically linear/matrix multiplications. The activation function may be a linear function or non-linear function (e.g., a sigmoid function, an arcTan function, a tan H function, a ReLu function, or the like).

Each of the fully connected operations is a linear operation in which every input is connected to every output by a weight (i.e., also referred to as a parameter). As such, a fully connected layer with N number of inputs and M outputs can have a total of N×M weights (i.e., parameters). As mentioned above, a Dense operation may be generally followed by a non-linear activation function to generate an output of that layer.

The example 500 includes an input layer 502. The example 500 also includes three strided convolution layers for downsampling (namely, layers 504, 506, 508) and three transposed convolutional layers for upsampling (namely, layers 510, 512, 514). With the increase of the receptive field, global information is extracted in both the time and frequency domain. The receptive field can be defined as the region in the input space that a particular feature is looking at and/or is affected by.

The example 500 is a kind of an encoder-decoder structure. As such, the down-sampling path squeezes the input Gammatone spectrogram to low-resolution feature maps, which model longer time and frequency dependencies; and the up-sampling path takes this compact representation as input and increase the resolution to map the output back into the original size.

In order to alleviate the information loss caused by the compression in the encoder and allow the direct propagation of the gradient, skip connections 516, 518 can be utilized to directly connect the layers of the same scale. Leaky rectified linear units (ReLU) and the sigmoid function can be used as the activation functions for the hidden layers and output layer, respectively. However, other activation functions are possible.

Figure 6:
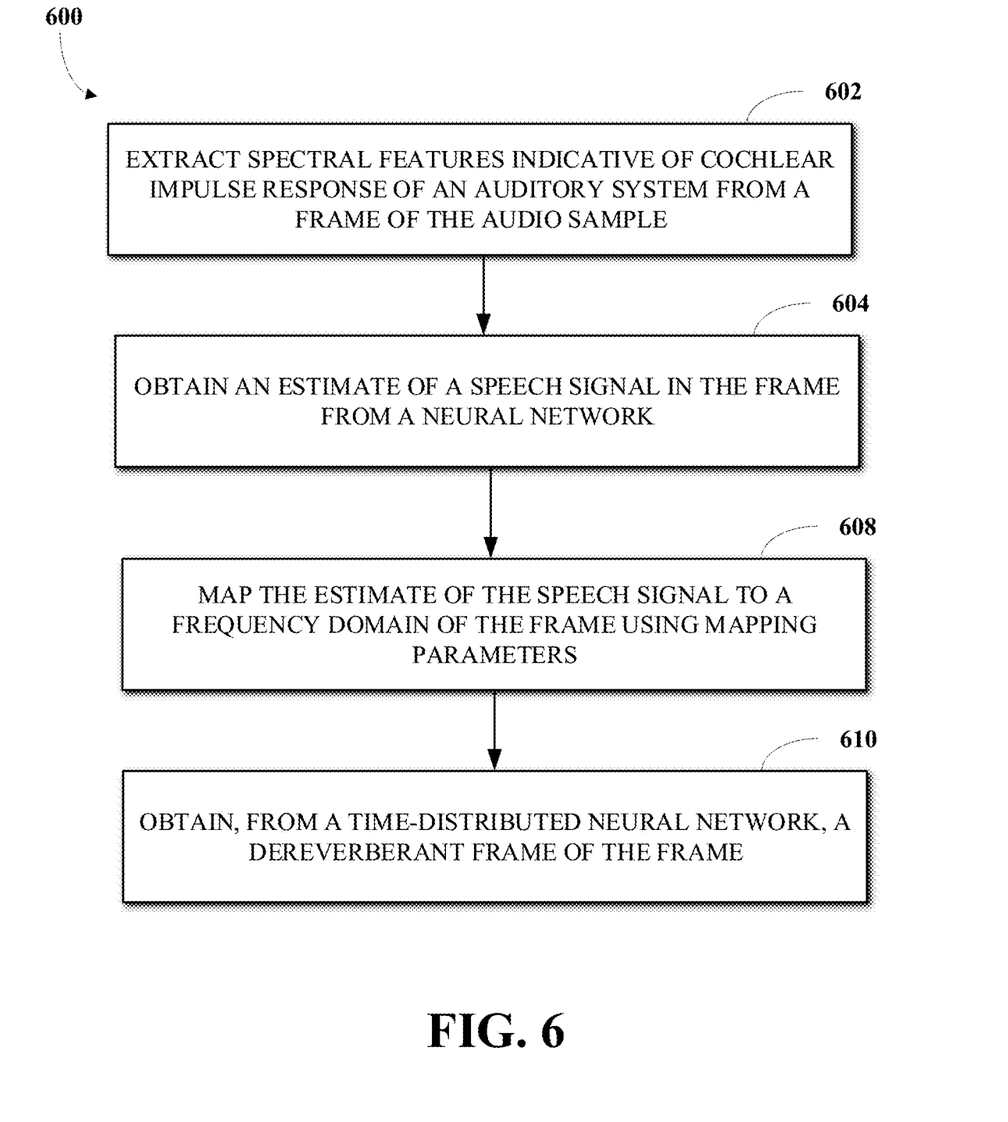
FIG. 6 is an example of a flowchart of a technique for denoising and dereverbating an audio sample according to implementations of this disclosure.

FIG. 6 is an example of a flowchart of a technique 600 for denoising and dereverbating an audio sample according to implementations of this disclosure. In an example, the technique 600 can receive an audio sample, such as an audio stream. The audio stream can be part of a video stream. In an example, the technique 600 can receive frames of the audio stream for processing. In an example, the technique 600 can partition the audio sample into frames and process each frame separately as further described below and consistent with the description of the technique 300 of FIG. 3.

The technique 600 can be implemented by a computing device, such as the computing device 400 of FIG. 4. The technique 600 can be implemented, for example, as a software program that may be executed by computing devices, such as the computing device 400 of FIG. 4. The software program can include machine-readable instructions that may be stored in a memory such as the memory 404 or the secondary storage 414, and that, when executed by a processor, such as CPU 402, may cause the computing device to perform the technique 600. The technique 600 can be implemented using specialized hardware or firmware. Multiple processors, memories, or both, may be used.

At 602, the technique 600 extracts, from a frame of the audio sample, spectral features indicative of cochlear impulse response of an auditory system. In an example, the spectral features can be extracted using a gammatone filter bank, as described above.

At 604, the technique 600 obtains an estimate of a speech signal in the frame from a neural network. The neural network can be as described with respect to the FCN2 314 of FIG. 3. Thus, the neural network is trained, during a training phase as described with respect to FIG. 1, to accept the spectral features as input and output the estimate of the speech signal. As mentioned above, the estimate of the speech signal can include reverberation but excludes noise present in the frame. In an example, the estimate of the speech signal that is output from the neural network is an estimate of a phase-sensitive mask (PSM), as described above. Thus, the estimate of the phase-sensitive mask can include predicted equivalent rectangular bandwidth (ERB) sub-band gains.

In an example, obtaining the estimate of the speech signal in the frame from the neural network can include concatenating the spectral features with corresponding features of a context window to obtain an input vector; and using the input vector as the input to the neural network.

At 606, the technique 600 maps the estimate of the speech signal to a frequency domain of the frame using mapping parameters that are obtained during the training phase to obtain an estimate of a reverberant speech spectrum in the frame, as described above with respect to the adaptive mapping phase 304 of FIG. 3. The frequency domain is the Fourier domain. In an example, the frequency domain can include Short-Time Fourier Transform (STFT) features extracted from the frame.

Mapping the estimate of the speech signal to a frequency domain of the frame using mapping parameters can include, using Formula (5) to estimate gains $g_{ij}$ with respect to each frequency bin within a sub-band.

At 608, the technique 600 obtains a dereverberant frame of the frame from a time-distributed neural network. The estimate of the reverberant speech spectrum in the frame is used as an input to the time-distributed neural network. The time-distributed neural network can be as described with respect to the TDDNN 322 of FIG. 3. In an example, the technique 600 uses log compression to change the dynamic range, as described with respect to the log-compression module 320 of FIG. 3. As such, obtaining the dereverberant frame of the frame from the time-distributed neural network can include log-compressing the reverberant speech spectrum in the frame to obtain a log-compressed reverberant speech spectrum; and using the log-compressed reverberant speech spectrum as the input to the time-distributed neural network.

Another aspect of the disclosed implementation is a system for denoising and dereverbating an audio sample. The system includes a noise reduction module, an adaptive mapping module, and a dereverberation module.

As described above with respect to FIG. 3, the noise reduction module can be configured to extract spectral features from a frame of the audio sample; and obtain an estimate of a speech signal in the frame from a first neural network that is trained, during a training phase, to accept the spectral features as input and output the estimate of the speech signal. As also described above, the adaptive mapping module can be configured to map, using mapping parameters obtained during the training phase, the estimate of the speech signal to a frequency domain of the frame to obtain an estimate of a reverberant speech spectrum in the frame. The dereverberation module can be configured to, as also described above, obtain a dereverberant frame of the frame from a time-distributed neural network, wherein the estimate of the reverberant speech spectrum in the frame is used in an input to the time-distributed neural network.

In the training phase, and as described with respect to the adaptive mapping phase 104 of FIG. 1, the adaptive mapping module can be trained by steps to receive a magnitude spectrum of training frames of the training audio sample, where the magnitude spectrum includes noise and reverberation frequencies; receive, from the noise reduction module, the estimate of the training speech signal; receive, from the noise reduction module, the estimate of the training noise signal; and tune the mapping parameters for the gain mapping with respect to a the magnitude spectrum. As described with respect to the TDDNN 122 of FIG. 1, the dereverberation module can be trained by steps to log-compress a magnitude spectrogram of a reverberant speech spectrogram; and train the time-distributed neural network to map the log-compressed magnitude spectrogram of the reverberant speech spectrogram to a clean and anechoic speech spectrum.

Another aspect of the disclosed implementations is a technique for denoising and dereverberating an audio (e.g., a speech) stream. The technique includes receiving the audio stream; and for at least some frames of the audio stream, performing: extracting gammatone features of a current frame of the at least some frames of the audio stream; inputting the gammatone features to a neural network that estimates ERB-sub-band gains in the current frame; obtaining a magnitude spectrum of the current frame; mapping the estimated ERB-sub-band gains into the magnitude spectrum to obtain an estimate of a reverberant speech spectrum in the current frame; applying a non-linear function to the reverberant speech spectrum in the current frame to obtain a compressed reverberant speech spectrum; and inputting the compressed reverberant speech spectrum to a time-distributed neural network to obtain a dereverberated current frame.

For simplicity of explanation, the techniques 100, 300, and 600 of FIGS. 1, 3, and 6, respectively, are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the computing device 400, and/or any of the components therein described with respect to FIG. 4 and/or any of the components therein described with respect to modules or components of FIG. 1 or FIG. 3, (and any techniques, algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, in one aspect, for example, the techniques described herein can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for denoising and dereverbating an audio sample, comprising:
    extracting, from a frame of the audio sample, spectral features indicative of cochlear impulse response of an auditory system;
    obtaining an estimate of a speech signal in the frame from a neural network that is trained, during a training phase, to accept the spectral features as input and output the estimate of the speech signal, wherein the estimate of the speech signal includes reverberation and excludes noise present in the frame;
    mapping the estimate of the speech signal to a frequency domain of the frame using mapping parameters obtained during the training phase to obtain an estimate of a reverberant speech spectrum in the frame; and
    obtaining, from a time-distributed neural network, a dereverberant frame of the frame, wherein the estimate of the reverberant speech spectrum in the frame is used as an input to the time-distributed neural network.

2. The method of claim 1, wherein the spectral features are extracted using a gammatone filter bank.

3. The method of claim 1, wherein the estimate of the speech signal that is output from the neural network is an estimate of a phase-sensitive mask.

4. The method of claim 3, wherein the estimate of the phase-sensitive mask comprises predicted equivalent rectangular bandwidth (ERB) sub-band gains.

5. The method of claim 4, wherein the frequency domain comprises Short-Time Fourier Transform (STFT) features extracted from the frame.

6. The method of claim 1, wherein obtaining the estimate of the speech signal in the frame from the neural network comprises:
    concatenating the spectral features with corresponding features of a context window to obtain an input vector; and
    using the input vector as the input to the neural network.

7. The method of claim 1, wherein obtaining the dereverberant frame of the frame from the time-distributed neural network comprises:
    log-compressing the reverberant speech spectrum in the frame to obtain a log-compressed reverberant speech spectrum; and
    using the log-compressed reverberant speech spectrum as the input to the time-distributed neural network.

8. The method of claim 1, wherein mapping the estimate of the speech signal to the frequency domain of the frame using mapping parameters obtained during the training phase to obtain the estimate of the reverberant speech spectrum in the frame comprises:
    estimating gains $g_{ij}$ with respect to each frequency bin within a sub-band using $$g_{ij} = \beta_{i-1,j} G_{i-1} + \beta_{i,j} G_i + \beta_{i+1,j} G_{i+1},$$

wherein $g_{ij}$ corresponds to a gain in a $j^{th}$ frequency bin in an $i^{th}$ ERB sub-band,
    wherein $G_{i-1}$, $G_i$ and $G_{i+1}$ represent respective gains of $(i-1)^{th}$, $i^{th}$ and $(i+1)^{th}$ sub-band, and
    wherein $\{\beta_{i-1,j}\ \beta_{i,j}\ \beta_{i+1,j}\}$ are the mapping parameters.

9. A system for denoising and dereverbating an audio sample, comprising:
    a noise reduction module;
    an adaptive mapping module; and
    a dereverberation module,
    wherein the noise reduction module configured to:
        extract spectral features from a frame of the audio sample indicative of cochlear impulse response of an auditory system; and
        obtain an estimate of a speech signal in the frame from a first neural network that is trained, during a training phase, to accept the spectral features as input and output the estimate of the speech signal, wherein the estimate of the speech signal includes reverberation and excludes noise present in the frame;
    wherein the adaptive mapping module configured to:
        map, using mapping parameters obtained during the training phase, the estimate of the speech signal to a frequency domain of the frame to obtain an estimate of a reverberant speech spectrum in the frame; and
    wherein the dereverberation module configured to:
        obtain a dereverberant frame of the frame from a time-distributed neural network, wherein the estimate of the reverberant speech spectrum in the frame is used in an input to the time-distributed neural network.

10. The system of claim 9, wherein in the training phase, the noise reduction module is trained by steps to:
- extract training spectral features from a training frame of a training audio sample;
- use the training spectral features to train the first neural network to estimate a training speech signal contained in the training audio sample; and
- use the training spectral features to train a second neural network to estimate a training noise signal contained in the training audio sample.

11. The system of claim 10,
wherein the training spectral features comprise gammatone features extracted using a 64-filter bank,
wherein the training speech signal is estimated by a phase-sensitive mask, and
wherein the training noise signal is estimated by an ideal ratio mask.

12. The system of claim 10, wherein in the training phase, the adaptive mapping module is trained by steps to:
- receive a magnitude spectrum of training frames of the training audio sample, wherein the magnitude spectrum comprises noise frequencies and reverberation frequencies;
- receive, from the noise reduction module, the estimate of the training speech signal;
- receive, from the noise reduction module, the estimate of the training noise signal; and
- tune the mapping parameters for the gain mapping with respect to a the magnitude spectrum.

13. The system of claim 12, wherein in the training phase, the dereverberation module is trained by steps to:
- log-compress a magnitude spectrogram of a reverberant speech spectrogram to obtain a log-compressed reverberant speech spectrum; and
- train the time-distributed neural network to map the log-compressed reverberant speech spectrum to a clean and anechoic speech spectrum.

14. An apparatus, comprising:
a processor configured to:
- extract, from a frame of an audio sample, spectral features indicative of cochlear impulse response of an auditory system;
- obtain an estimate of a speech signal in the frame from a neural network that is trained, during a training phase, to accept the spectral features as input and output the estimate of the speech signal, wherein the estimate of the speech signal includes reverberation and excludes noise present in the frame;
- map the estimate of the speech signal to a frequency domain of the frame using mapping parameters obtained during the training phase to obtain an estimate of a reverberant speech spectrum in the frame; and
- obtain, from a time-distributed neural network, a dereverberant frame of the frame, wherein the estimate of the reverberant speech spectrum in the frame is used as an input to the time-distributed neural network.

15. The apparatus of claim 14, wherein the spectral features are extracted using a gammatone filter bank.

16. The apparatus of claim 14, wherein the estimate of the speech signal that is output from the neural network is an estimate of a phase-sensitive mask.

17. The apparatus of claim 16, wherein the estimate of the phase-sensitive mask comprises predicted equivalent rectangular bandwidth (ERB) sub-band gains.

18. The apparatus of claim 17, wherein the frequency domain comprises Short-Time Fourier Transform (STFT) features extracted from the frame.

19. The apparatus of claim 14, wherein to obtain the estimate of the speech signal in the frame from the neural network comprises to:
- concatenate the spectral features with corresponding features of a context window to obtain an input vector; and
- use the input vector as the input to the neural network.

20. The apparatus of claim 14, wherein to obtain the dereverberant frame of the frame from the time-distributed neural network comprises to:
- log-compress the reverberant speech spectrum in the frame to obtain a log-compressed reverberant speech spectrum; and
- use the log-compressed reverberant speech spectrum as the input to the time-distributed neural network.

* * * * *